US009570070B2

(12) United States Patent
Baldwin et al.

(10) Patent No.: US 9,570,070 B2
(45) Date of Patent: Feb. 14, 2017

(54) SYSTEM AND METHOD FOR PROCESSING MULTI-MODAL DEVICE INTERACTIONS IN A NATURAL LANGUAGE VOICE SERVICES ENVIRONMENT

(71) Applicant: VOICEBOX TECHNOLOGIES CORPORATION, Bellevue, WA (US)

(72) Inventors: Larry Baldwin, Maple Valley, WA (US); Chris Weider, Seattle, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/822,179

(22) Filed: Aug. 10, 2015

(65) Prior Publication Data

US 2015/0348544 A1 Dec. 3, 2015

Related U.S. Application Data

(63) Continuation of application No. 14/278,645, filed on May 15, 2014, now Pat. No. 9,105,266, which is a
(Continued)

(51) Int. Cl.
*G10L 17/00* (2013.01)
*G10L 15/18* (2013.01)
(Continued)

(52) U.S. Cl.
CPC ........... *G10L 15/1815* (2013.01); *G06Q 30/02* (2013.01); *G06Q 30/0241* (2013.01); *G10L 15/18* (2013.01);
(Continued)

(58) Field of Classification Search
CPC .......... G10L 15/22; G10L 15/19; G10L 15/00; G10L 15/1815; G10L 15/183; G10L 15/24; G10L 15/265; G10L 15/30; G10L 15/063; G10L 15/26; G10L 15/08; G10L 15/20; G10L 15/1822; G10L 15/07; G06F 9/4443; G06F 2203/0381; G06F 3/017; G06F 3/0488; B60R 16/0373
(Continued)

(56) References Cited

U.S. PATENT DOCUMENTS 4,430,669 A 2/1984 Cheung
4,821,027 A 4/1989 Mallory
(Continued)

FOREIGN PATENT DOCUMENTS

CN 1433554 A 7/2003
EP 1320043 A2 6/2003
(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.
(Continued)

*Primary Examiner* — Huyen Vo
(74) *Attorney, Agent, or Firm* — Sheppard Mullin Richter & Hampton LLP

(57) ABSTRACT

A system and method for processing multi-modal device interactions in a natural language voice services environment may be provided. In particular, one or more multi-modal device interactions may be received in a natural language voice services environment that includes one or more electronic devices. The multi-modal device interactions may include a non-voice interaction with at least one of the electronic devices or an application associated therewith, and may further include a natural language utterance relating to the non-voice interaction. Context relating to the non-voice interaction and the natural language utterance may be extracted and combined to determine an intent of the
(Continued)

multi-modal device interaction, and a request may then be routed to one or more of the electronic devices based on the determined intent of the multi-modal device interaction.

33 Claims, 4 Drawing Sheets

Related U.S. Application Data continuation of application No. 13/692,451, filed on Dec. 3, 2012, now Pat. No. 8,738,380, which is a continuation of application No. 12/389,678, filed on Feb. 20, 2009, now Pat. No. 8,326,637.

(51) Int. Cl.
  *G10L 17/22* (2013.01)
  *G06Q 30/02* (2012.01)
  *G10L 15/24* (2013.01)
  *G10L 15/22* (2006.01)
(52) U.S. Cl.
  CPC .............. *G10L 15/22* (2013.01); *G10L 15/24* (2013.01); *G10L 17/22* (2013.01); *G10L 2015/223* (2013.01)
(58) Field of Classification Search
  USPC ................. 704/251, 255, 257, 270, 1–10, 250,704/270.1, 275, 277
  See application file for complete search history.

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder et al. |
| 5,721,938 A | 2/1998 | Stuckey |
| 5,722,084 A | 2/1998 | Chakrin et al. |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,983,190 A | 11/1999 | Trower, II |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,059 A | 6/2000 | Glickman |
| 6,078,886 A | 6/2000 | Dragosh |
| 6,081,774 A | 6/2000 | deHita |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |
| 6,188,982 B1 | 2/2001 | Chiang |
| 6,192,110 B1 | 2/2001 | Abella |
| 6,192,338 B1 | 2/2001 | Haszto |

(56) References Cited

U.S. PATENT DOCUMENTS

| | | |
|---|---|---|
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,377,913 B1 | 4/2002 | Coffman |
| 6,381,535 B1 | 4/2002 | Durocher |
| 6,385,596 B1 | 5/2002 | Wiser |
| 6,385,646 B1 | 5/2002 | Brown |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Quilici |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | Der Ghazarian |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,757,544 B2 | 6/2004 | Rangarajan |
| 6,757,718 B1 | 6/2004 | Halverson |
| 6,795,808 B1 | 9/2004 | Strubbe |
| 6,801,604 B2 | 10/2004 | Maes |
| 6,801,893 B1 | 10/2004 | Backfried |
| 6,810,375 B1 | 10/2004 | Ejerhed |
| 6,813,341 B1 | 11/2004 | Mahoney |
| 6,816,830 B1 | 11/2004 | Kempe |
| 6,829,603 B1 | 12/2004 | Wolf |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |

(56) References Cited

U.S. PATENT DOCUMENTS

| | | |
|---|---|---|
| 6,873,837 B1 | 3/2005 | Yoshioka |
| 6,877,001 B2 | 4/2005 | Wolf |
| 6,877,134 B1 | 4/2005 | Fuller |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,993 B1 | 12/2005 | Keiller |
| 6,980,092 B2 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,738 B2 | 3/2009 | Kennewick |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |

(56) References Cited

U.S. PATENT DOCUMENTS

| | | |
|---|---|---|
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 * | 1/2012 | Sato ............ B60R 16/0373 704/231 |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,589,161 B2 | 11/2013 | Kennewick |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,406,078 B2 | 8/2016 | Freeman |
| 9,502,025 B2 | 11/2016 | Kennewick |
| 2001/0039492 A1 | 11/2001 | Nemoto |
| 2001/0041980 A1 | 11/2001 | Howard |
| 2001/0049601 A1 | 12/2001 | Kroeker |
| 2001/0054087 A1 | 12/2001 | Flom |
| 2002/0010584 A1 | 1/2002 | Schultz |
| 2002/0015500 A1 | 2/2002 | Belt |
| 2002/0022927 A1 | 2/2002 | Lemelson |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0014261 A1 | 1/2003 | Kageyama |
| 2003/0016835 A1 | 1/2003 | Elko |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 * | 3/2004 | Kennewick ............ G10L 15/22 704/5 |
| 2004/0098245 A1 | 5/2004 | Walker |
| 2004/0117179 A1 | 6/2004 | Balasuriya |
| 2004/0117804 A1 | 6/2004 | Scahill |
| 2004/0122674 A1 | 6/2004 | Bangalore |
| 2004/0133793 A1 | 7/2004 | Ginter |
| 2004/0140989 A1 | 7/2004 | Papageorge |

(56) References Cited

U.S. PATENT DOCUMENTS

| | | |
|---|---|---|
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0205671 A1 | 10/2004 | Sukehiro |
| 2004/0243417 A9 | 12/2004 | Pitts |
| 2004/0247092 A1 | 12/2004 | Timmins |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1* | 4/2005 | Endo ............... G10L 15/08 704/277 |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0216254 A1 | 9/2005 | Gupta |
| 2005/0234727 A1 | 10/2005 | Chiu |
| 2005/0246174 A1 | 11/2005 | DeGolia |
| 2005/0283364 A1* | 12/2005 | Longe ............. G06K 9/00422 704/257 |
| 2005/0283752 A1 | 12/2005 | Fruchter |
| 2006/0041431 A1 | 2/2006 | Maes |
| 2006/0047509 A1 | 3/2006 | Ding |
| 2006/0072738 A1 | 4/2006 | Louis |
| 2006/0074671 A1 | 4/2006 | Farmaner |
| 2006/0100851 A1 | 5/2006 | Schonebeck |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0242017 A1 | 10/2006 | Libes |
| 2006/0253281 A1 | 11/2006 | Letzt |
| 2006/0285662 A1 | 12/2006 | Yin |
| 2007/0033005 A1 | 2/2007 | Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0055525 A1 | 3/2007 | Kennewick |
| 2007/0061067 A1 | 3/2007 | Zeinstra |
| 2007/0061735 A1 | 3/2007 | Hoffberg |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0299824 A1 | 12/2007 | Pan |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1* | 3/2008 | Cross ............... G06F 9/4443 704/270 |
| 2008/0065389 A1 | 3/2008 | Cross |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0189110 A1 | 8/2008 | Freeman |
| 2008/0228496 A1 | 9/2008 | Yu |
| 2008/0235023 A1 | 9/2008 | Kennewick |
| 2008/0235027 A1 | 9/2008 | Cross |
| 2008/0294437 A1 | 11/2008 | Nakano |
| 2008/0294994 A1 | 11/2008 | Kruger |
| 2008/0319751 A1 | 12/2008 | Kennewick |
| 2009/0006077 A1 | 1/2009 | Keaveney |
| 2009/0024476 A1 | 1/2009 | Baar |
| 2009/0052635 A1 | 2/2009 | Jones |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0164216 A1* | 6/2009 | Chengalvarayan . B60R 16/0373 704/251 |
| 2009/0171664 A1 | 7/2009 | Kennewick |
| 2009/0216540 A1 | 8/2009 | Tessel |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1* | 4/2010 | Freer ............... G06Q 30/02 705/14.54 |
| 2010/0138300 A1 | 6/2010 | Wallis |
| 2010/0145700 A1 | 6/2010 | Kennewick |

(56) References Cited

U.S. PATENT DOCUMENTS

| | | |
|---|---|---|
| 2010/0185512 A1 | 7/2010 | Borger |
| 2010/0204986 A1 | 8/2010 | Kennewick |
| 2010/0204994 A1 | 8/2010 | Kennewick |
| 2010/0217604 A1 | 8/2010 | Baldwin |
| 2010/0286985 A1 | 11/2010 | Kennewick |
| 2010/0299142 A1 | 11/2010 | Freeman |
| 2010/0312566 A1 | 12/2010 | Odinak |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0307167 A1 | 12/2011 | Taschereau |
| 2012/0022857 A1 | 1/2012 | Baldwin |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0339022 A1 | 12/2013 | Baldwin |
| 2014/0006951 A1 | 1/2014 | Hunter |
| 2014/0012577 A1 | 1/2014 | Freeman |
| 2014/0108013 A1 | 4/2014 | Cristo |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0365222 A1 | 12/2014 | Weider |
| 2015/0019217 A1 | 1/2015 | Cristo |
| 2015/0019227 A1 | 1/2015 | Anandarajah |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0228276 A1 | 8/2015 | Baldwin |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick, Jr. |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1646037 | 4/2006 |
| JP | H11249773 | 9/1999 |
| JP | 2001071289 | 3/2001 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| WO | 9946763 | 9/1999 |
| WO | 0021232 | 1/2000 |
| WO | 0046792 | 1/2000 |
| WO | 0171609 A2 | 9/2001 |
| WO | 0178065 | 10/2001 |
| WO | 2004072954 | 1/2004 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., The Network Vehicle—A Glimpse into the Future of Mobile Multi-Media, IEEE Aerosp. Electron. Systems Magazine, vol. 14, No. 9, Sep. 1999, pp. 27-32.

(56) References Cited

OTHER PUBLICATIONS

Mao, Mark Z., "Automatic Training Set Segmentation for Multi-Pass Speech Recognition", Department of Electrical Engineering, Stanford University, CA, copyright 2005, IEEE, pp. 1-685 to 1-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.

Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.

Zhao, Yilin, "Telematics: Safe and Fun Driving", IEEE Intelligent Systems, vol. 17, Issue 1, 2002, pp. 10-14.

Davis, Z., et al., A Personal Handheld Multi-Modal Shopping Assistant, IEEE, 2006, 9 pages.

* cited by examiner

SYSTEM AND METHOD FOR PROCESSING MULTI-MODAL DEVICE INTERACTIONS IN A NATURAL LANGUAGE VOICE SERVICES ENVIRONMENT

CROSS-REFERENCE TO RELATED APPLICATIONS

This application is a continuation of U.S. patent application Ser. No. 14/278,645, entitled "System and Method for Processing Multi-Modal Device Interactions in a Natural Language Voice Services Environment," filed on May 15, 2014, which is a continuation of U.S. patent application Ser. No. 13/692,451, entitled "System and Method for Processing Multi-Modal Device Interactions in a Natural Language Voice Services Environment," filed on Dec. 3, 2012, which issued as U.S. Pat. No. 8,738,380 on May 27, 2014, which is a continuation of U.S. patent application Ser. No. 12/389,678, entitled "System and Method for Processing Multi-Modal Device Interactions in a Natural Language Voice Services Environment," filed on Feb. 20, 2009, which issued as U.S. Pat. No. 8,326,637 on Dec. 4, 2012, the contents of which are hereby incorporated by reference in its entirety.

FIELD OF THE INVENTION

The invention relates to an integrated natural language voice services environment for processing multi-modal interactions with or one or more devices and/or applications, wherein the multi-modal interactions may provide additional context for cooperatively interpreting and otherwise processing a natural language utterance accompanying the multi-modal interactions.

BACKGROUND OF THE INVENTION

As technology has progressed in recent years, consumer electronic devices have emerged to become nearly ubiquitous in the everyday lives of many people. To meet the increasing demand that has resulted from growth in the functionality and mobility of mobile phones, navigation devices, embedded devices, and other such devices, many devices offer a wealth of features and functions in addition to core applications. Greater functionality also introduces trade-offs, however, including learning curves that often inhibit users from fully exploiting all of the capabilities of their electronic devices. For example, many existing electronic devices include complex human to machine interfaces that may not be particularly user-friendly, which can inhibit mass-market adoption for many technologies. Moreover, cumbersome interfaces often result in otherwise desirable features being difficult to find or use (e.g., because of menus that are complex or otherwise tedious to navigate). As such, many users tend not to use, or even know about, many of the potential capabilities of their devices.

As such, the increased functionality of electronic devices often tends to be wasted, as market research suggests that many users only use only a fraction of the features or applications available on a given device. Moreover, in a society where wireless networking and broadband access are increasingly prevalent, consumers tend to naturally desire seamless mobile capabilities from their electronic devices. Thus, as consumer demand intensifies for simpler mechanisms to interact with electronic devices, cumbersome interfaces that prevent quick and focused interaction become an important concern. Nevertheless, the ever-growing demand for mechanisms to use technology in intuitive ways remains largely unfulfilled.

One approach towards simplifying human to machine interactions in electronic devices has included the use of voice recognition software, which has the potential to enable users to exploit features that would otherwise be unfamiliar, unknown, or difficult to use. For example, a recent survey conducted by the Navteq Corporation, which provides data used in a variety of applications such as automotive navigation and web-based applications, demonstrates that voice recognition often ranks among the features most desired by consumers of electronic devices. Even so, existing voice user interfaces, when they actually work, still require significant learning on the part of the user.

For example, many existing voice user interface only support requests formulated according to specific command-and-control sequences or syntaxes. Furthermore, many existing voice user interfaces cause user frustration or dissatisfaction because of inaccurate speech recognition. Similarly, by forcing a user to provide pre-established commands or keywords to communicate requests in ways that a system can understand, existing voice user interfaces do not effectively engage the user in a productive, cooperative dialogue to resolve requests and advance a conversation towards a satisfactory goal (e.g., when users may be uncertain of particular needs, available information, device capabilities, etc.). As such, existing voice user interfaces tend to suffer from various drawbacks, including significant limitations on engaging users in a dialogue in a cooperative and conversational manner.

Additionally, many existing voice user interfaces fall short in utilizing information distributed across different domains, devices, and applications in order to resolve natural language voice-based inputs. Thus, existing voice user interfaces suffer from being constrained to a finite set of applications for which they have been designed, or to devices on which they reside. Although technological advancement has resulted in users often having several devices to suit their various needs, existing voice user interfaces do not adequately free users from device constraints. For example, users may be interested in services associated with different applications and devices, but existing voice user interfaces tend to restrict users from accessing the applications and devices as they see fit. Moreover, users typically can only practicably carry a finite number of devices at any given time, yet content or services associated with users' other devices currently being used may be desired in various circumstances.

Accordingly, although users tend to have varying needs, where content or services associated with different devices may be desired in various contexts or environments, existing voice technologies tend to fall short in providing an integrated environment in which users can request content or services associated with virtually any device or network. As such, constraints on information availability and device interaction mechanisms in existing voice services environments tend to prevent users from experiencing technology in an intuitive, natural, and efficient way. For instance, when a user wishes to perform a given function using a given electronic device but does not necessarily know how to go about performing the function, the user typically cannot engage in a multi-modal interaction with the device to simply utter words in natural language to request the function.

Furthermore, relatively simple functions can often be tedious to perform using electronic devices that do not have voice recognition capabilities. For example, purchasing new ring-tones for a mobile phone tends to be a relatively straightforward process, but users must typically navigate several menus and press many different buttons in order to complete the process. As such, it becomes apparent that interaction with electronic devices could be far more efficient if users were able to use natural language to exploit buried or otherwise difficult to use functionality. Existing systems suffer from these and other problems.

SUMMARY OF THE INVENTION

According to one aspect of the invention, a system and method for processing multi-modal device interactions in a natural language voice services environment may be provided. In particular, one or more multi-modal interactions may be received in a natural language voice services environment that includes one or more electronic devices. The multi-modal device interactions may include a user engaging in a non-voice interaction with one or more of the electronic devices or applications associated with the devices, while also providing a natural language utterance in relation to the non-voice interaction. For example, the non-voice device interaction may comprise the user selecting a particular segment, item, data, point of focus, or attention focus, or otherwise engaging in one or more unique and distinguishable interactions with the electronic devices or applications associated therewith. As such, context may be extracted from the natural language utterance, and the non-voice device interaction may provide additional context for the natural language utterance. The context of the utterance and the non-voice device interaction may then be combined to determine an intent of the multi-modal device interaction, wherein one or more of the electronic devices may process a request based on the intent of the multi-modal device interaction.

According to one aspect of the invention, at least one of the electronic devices may include an input device configured to receive voice-based inputs. In one implementation, the voice-based input device may be signaled to capture the natural language utterance in response to detecting the non-voice interaction with the one or more electronic devices or applications. Furthermore, the natural language voice services environment may include one or more listeners established for the electronic devices and the associated applications, wherein the listeners may be configured to detect the non-voice interaction with the electronic devices or applications. As such, information relating to the non-voice interaction and the accompanying natural language utterance may be aligned to enable cooperative processing of the utterance and the non-voice device interaction.

According to one aspect of the invention, at least one transaction lead may be generated based on the intent of the multi-modal device interaction. For example, a further multi-modal device interaction may be received, wherein the further multi-modal device interaction may relate to the transaction lead generated for the first multi-modal device interaction. At least one request may then be routed to one or more of the electronic devices based on an intent determined for the further multi-modal device interaction, whereby a transaction click-through may be processed in response to receiving the device interaction relating to the generated transaction lead. For example, the transaction lead may include an advertisement or a recommendation that is selected based on the intent of the original multi-modal device interaction, while the further multi-modal device interaction may include a user selecting the advertisement or recommendation. Thus, the selection of the advertisement or recommendation may be considered a transaction click-through, which may generate revenue for a particular entity (e.g., a provider of the natural language voice services environment).

Other objects and advantages of the invention will be apparent based on the following drawings and detailed description.

DETAILED DESCRIPTION

Figure 1:
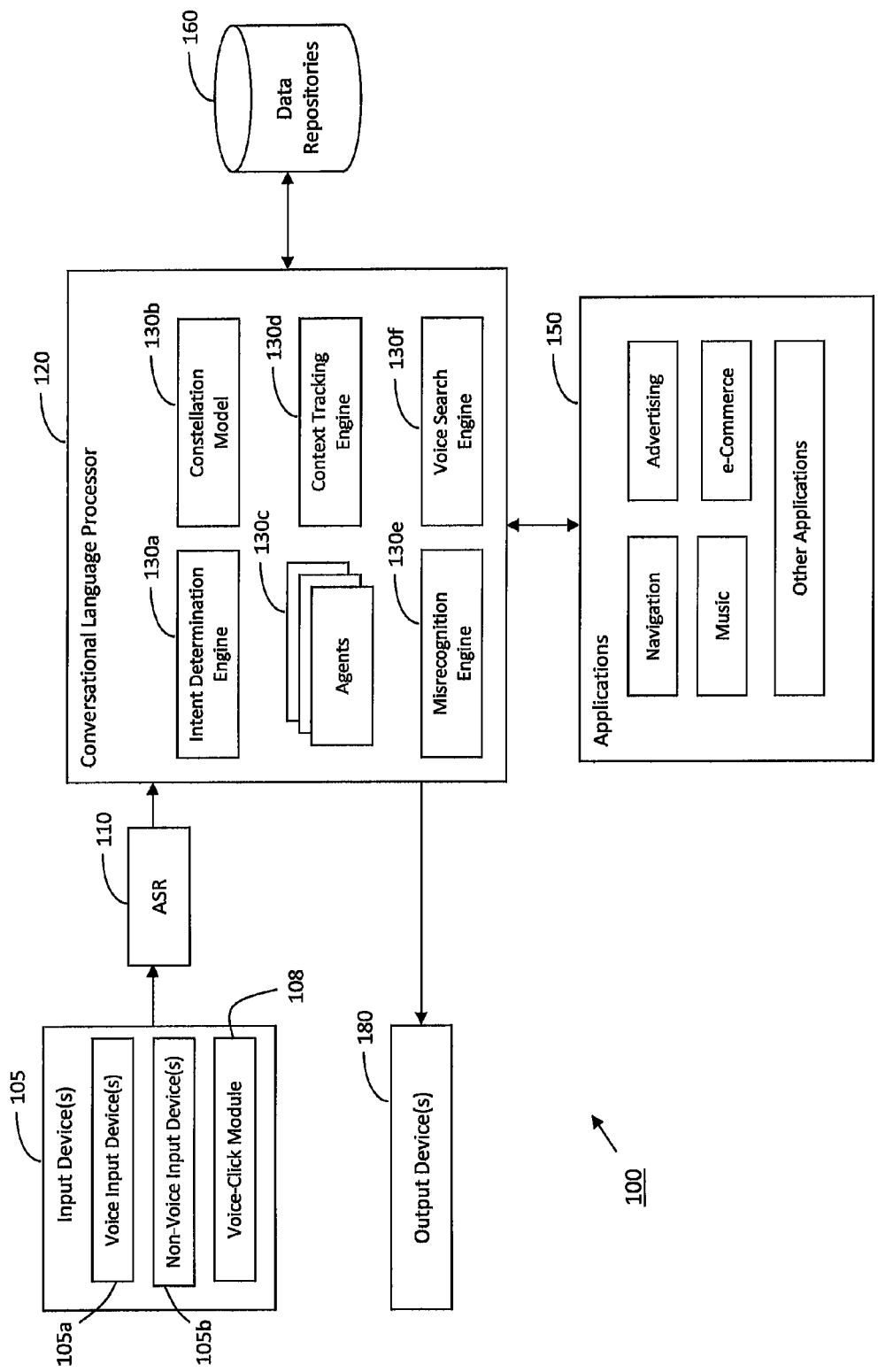
FIG. 1 illustrates a block diagram of an exemplary system for processing multi-modal device interactions in a natural language voice services environment, according to various aspects of the invention.

According to various aspects of the invention, FIG. 1 illustrates a block diagram of an exemplary system 100 for processing multi-modal device interactions in a natural language voice services environment. As will be apparent from the further description to be provided herein, the system 100 illustrated in FIG. 1 may include an input device 105, or a combination of input devices 105, which enable users to interact with the system 100 in a multi-modal manner. In particular, the system 100 may include various natural language processing components, including at least a voice-click module 108, which can collectively process a user's multi-modal interactions with one or more input devices 105. For example, in one implementation, the input devices 105 may include any suitable combination of at least one voice input device 105a (e.g., a microphone) and at least one non-voice input device 105b (e.g., a mouse, touch-screen display, wheel selector, etc.). As such, the input devices 105 may include any suitable combination of electronic devices having mechanisms for receiving both voice-based and non-voice-based inputs (e.g., a microphone coupled to one or more of a telematics device, personal navigation device, mobile phone, VoIP node, personal computer, media device, embedded device, server, or other electronic device). As such, the system 100 may enable users to engage in multi-modal conversational interactions with the one or more electronic input devices 105 or applications associated with the electronic devices 105, wherein the system 100 may process the device interactions in a free-form and cooperative manner suitable for routing tasks or otherwise resolving requests.

As indicated above, in one implementation, the system may include various natural language processing components that can support free-form utterances and/or other forms of device interactions, which may liberate users from restrictions relating to the manner of formulating commands, queries, or other requests. As such, users may interact with the input devices 105 using any manner of speaking into the voice input device 105a or otherwise interacting with the non-voice input devices 105b in order to request content or services available in the system 100. For instance, a user may request any content or services that may be available in the system 100 by providing a natural language utterance to the voice input device 105a. In one implementation, the utterance may then be processed using techniques described in U.S. Pat. No. 7,398,209, entitled "Systems and Methods for Responding to Natural Language Speech Utterance," issued Jul. 8, 2008, and U.S. patent application Ser. No. 10/618,633, entitled "Mobile Systems and Methods for Responding to Natural Language Speech Utterance," filed Jun. 15, 2003, the disclosures of which are hereby incorporated by reference in their entirety. In addition, the user may interact with one or more of the non-voice input devices 105b to provide further context or other information relating to the utterance and/or the requested content or services.

In one implementation, the system 100 may be coupled to various other systems that include additional multi-modal devices, with the other systems having natural language processing capabilities similar to those shown in FIG. 1. The system 100 may therefore provide an interface to a multi-device environment in which users may request content or services available through the various additional devices in the environment. For example, in one implementation, the system 100 may include a constellation model 130b that provides knowledge relating to content, services, applications, intent determination capabilities, and other features available through the other systems and devices in the environment. For example, in one implementation, the system 100 may interact with devices, applications, or other systems in the environment to cooperatively resolve requests, as described in co-pending U.S. patent application Ser. No. 12/127,343, entitled "System and Method for an Integrated, Multi-Modal, Multi-Device Natural Language Voice Services Environment," filed May 27, 2008, the disclosure of which is hereby incorporated by reference in its entirety. For example, the multi-device environment may share information among various systems and devices to provide a cooperative environment for resolving requests, wherein the shared information may relate to aspects such as device capabilities, context, prior interactions, domain knowledge, short-term knowledge, long-term knowledge, and cognitive models, among other things.

As indicated above, the system 100 illustrated in FIG. 1 may include, among other things, one or more electronic input devices 105 that collectively provide an interface (or combination of interfaces) for receiving one or more multi-modal device interactions from a user, wherein the device interactions include at least a user-spoken utterance. Although the implementation illustrated in FIG. 1 includes a distinct voice input device 105a and non-voice input device 105b, it will be apparent that in one or more implementations the voice input device 105a and the non-voice input device 105b may be components of the same or separate devices. For example, the input devices 105 may include a microphone coupled to a mobile phone (i.e., the voice input device 105a), and may further include one or more buttons, selectable displays, wheel selectors, or other components coupled to the mobile phone (i.e., the non-voice input devices 105b). In another example, the input devices 105 may include a combination of a microphone coupled to a telematics device (i.e., the voice input device 105a), and may further include buttons, a touch-screen display, a track wheel, or other non-voice input devices 105b coupled to a media player that is communicatively coupled to, yet distinct from, the telematics device. Thus, the input devices 105 may include any suitable combination of communicatively coupled electronic devices that includes at least one input device for receiving natural language utterance inputs and at least one input device for receiving multi-modal non-voice inputs.

In one implementation, a voice-click module 108 communicatively coupled to the one or more input devices 105 may enable cooperative processing of multi-modal device interactions received at the voice input device 105a and one or more of the non-voice input devices 105b. For example, the voice-click module 108 may provide the system 100 with information that can be used to process a natural language utterance received via the voice input device 105a in view of one or more non-voice device interactions received via the non-voice input devices 105b. The voice-click module 108 therefore enables the user to interact with the various input devices 105 in an intuitive and free-form manner, whereby the user may provide various types of information to the system 100 when seeking to initiate action, retrieve information, or otherwise request content or services available in the system 100.

The voice input device 105a may comprise any appropriate device, or combination of devices, which have capabilities for receiving natural language utterances or other forms of spoken input. For example, in one implementation, the voice input device 105a may include a directional microphone, an array of microphones, or other devices capable of creating encoded speech. In one implementation, the voice input device 105a may be configured to maximize fidelity of the encoded speech. For example, the voice input device 105a may be configured to maximize gain in a direction of the user, cancel echoes, null point noise sources, perform variable rate sampling, filter environmental noise or background conversations, or use other techniques to maximize the fidelity of the encoded speech. As such, the voice input device 105a may create the encoded speech in a manner tolerant of noise or other factors that could otherwise interfere with the system 100 accurately interpreting natural language utterances.

The non-voice input device 105b may comprise any appropriate device, or combination of devices, which have capabilities for supporting non-voice device interactions. For example, in one implementation, the non-voice input device 105b may include a combination stylus and touch-screen or tablet interface, a BlackBerry® wheel selector, an iPod® click wheel, a mouse, a keypad, buttons, or any other devices that supports distinguishable non-voice device interactions. The user may therefore use the non-voice input devices 105b to make data selections or identify a point of focus (or attention focus) to be processed in connection with a related natural language utterance provided via the voice input device 105a. For example, the user may point a stylus at a specific segment of a touch-screen display, highlight text using a mouse, click a button, interact with an application, or otherwise engage in any suitable device interaction for selecting data or otherwise identifying a point of focus (i.e., voice-activating or "voice-clicking" the selected data and/or the identified point of focus).

Furthermore, in addition to being usable for making data selections, identifying points of focus, or otherwise activating data to be interpreted in association with one or more utterances, the user may further use the non-voice input devices 105b to engage in specialized device interactions that have meaning in the system 100. For example, the specialized device interactions (which may be referred to as "clicks" or "voice-clicks") may include clicks lasting a given duration, clicks continuously held for a given duration, clicks made in a predetermined sequence, or any other interaction or sequence of interactions that the input devices 105 and/or the voice-click module 108 can identify, detect, or otherwise distinguish.

In one implementation, the specialized device interactions may be associated with one or more actions, queries, commands, tasks, or other requests associated with applications or services available in the system 100. In one implementation, the specialized device interactions may further include one or more actions, queries, commands, tasks, or other requests associated with any of various devices deployed in the multi-device environment, as described in the above-referenced co-pending U.S. patent application Ser. No. 12/127,343, entitled "System and Method for an Integrated, Multi-Modal, Multi-Device Natural Language Voice Services Environment," filed May 27, 2008. For example, a distinct sequence of clicking a stylus on a particular segment or item displayed on a touch-screen display may be defined as a specialized device interaction or voice-click for initiating a telephone call on a mobile phone, calculating a route on a navigation device, purchasing a song to a media player, or another type of request.

Thus, the voice-click module 108 coupled to the input device 105 may continually monitor the user's interactions with the non-voice input device 105*b* to detect occurrences of at least one non-voice device interaction, which may be referred to herein as a "voice-click." The detected voice-click may therefore provide further context for processing a multi-modal device interaction, which may include the at least one voice-click and one or more natural language utterances, each of which may provide context for task specification. Thus, the voice-click may generally signal the system 100 that a current utterance or other voice-based input is to be processed together with a current interaction with one or more of the devices 105. For example, in one implementation, the current device interaction may include the user selecting, highlighting, or otherwise identifying a particular point of attention, object, or other item associated with one or more of the devices 105. As such, the current device interaction may provide context for sharpening recognition, interpretation, and understanding of the accompanying utterance, and moreover, the current utterance may provide information to enhance the context provided by the accompanying device interaction.

In one implementation, the voice-click module 108 may determine the various voice-click interactions to be detected based on particular characteristics of the non-voice input devices 105*b* (e.g., the voice-click interactions may include distinguishable interactions that the non-voice input devices 105*b* support). For example, a multi-touch display typically includes a touch-screen display device configured to support various distinguishable gestures for interacting with information displayed therein (e.g., a user may zoom in, zoom out, rotate, or otherwise control graphical information displayed on a multi-touch screen using specific gestures or other interaction techniques). Thus, in one example, the non-voice input devices 105*b* may include a multi-touch display, in which case the voice-click module 108 may be configured to detect an occurrence of a voice-click when a user engages in one or more of the distinguishable gestures supported by the non-voice multi-touch display 105*b*.

In one implementation, a user may customize or otherwise modify the voice-click interactions to be detected by the voice-click module 108. In particular, the specific device interactions detected by the voice-click module 108 may be removed or modified, or new device interactions may be added. As such, the voice-click device interactions detected by the voice-click module 108 may include any appropriate interaction or combination of interactions that the non-voice input devices 105*b* and/or the voice-click module 108 can distinguish.

When the voice-click module 108 detects a user's engaging in a voice-click device interaction, the voice-click module 108 may extract context information associated with the voice-click device interaction for voice-activation. In particular, the voice-click module 108 may identify information relating to a segment, item, point of focus, attention focus, or other data selected by the user, or otherwise identify information relating to a particular device interaction or sequence of device interactions engaged in by the user. The voice-click module 108 thus extracts the identified information relating to the detected voice-click, which may be used as context information to be associated with one or more prior, contemporaneous, or subsequent natural language utterances.

Thus, in response to the voice-click module 108 detecting a voice-click (e.g., selection of an icon, a section of text, specific coordinates on a map display, or other information), the voice-click module 108 may signal the system 100 to use a natural language utterance voice input (which may be received via the voice input device 105*a*) as further context for determining an action, query, command, task, or other request to perform in order to service the detected voice-click. As such, the various natural language processing components in the system 100 may use the combined context of the voice-click and the accompanying natural language utterance to determine the intent of the voice-click device interaction, and to appropriately route one or more actions, queries, commands, tasks, or other requests to any of the various devices deployed in the multi-device environment.

For instance, in one implementation, the multi-device environment may include a voice-enabled navigation device. Thus, an exemplary voice-click device interaction may include a user touching a stylus to a specific intersection displayed on a touch-screen display 105*b* associated with the voice-enabled navigation device, while also providing an utterance such as "What restaurants are around here?" into a microphone 105*a*. In this example, the voice-click module 108 may extract information relating to the voice-clicked intersection, which may be used as context for processing the accompanying utterance (i.e., the selected intersection may provide context for interpreting "around here," as opposed to the user's current location or some other meaning). Moreover, as indicated above, the voice input may be used as additional context for determining task specification. Thus, the utterance may be further processed for recognition and conversational interpretation using the various natural language processing components of the system 100, as described in greater detail below.

In one implementation, an Automatic Speech Recognizer (ASR) 110 may generate one or more preliminary interpretations of the utterance received via the voice input device 105*a*. For example, the ASR 110 may recognize syllables, words, phrases, or other acoustic characteristics of the utterance using one or more dynamically adaptable recognition grammars. In one implementation, the dynamic recognition grammars may be used to recognize a stream of phonemes using phonetic dictation based on one or more acoustic models (e.g., as described in co-pending U.S. patent application Ser. No. 11/197,504, entitled "Systems and Methods for Responding to Natural Language Speech Utterance," filed Aug. 5, 2005, the disclosure of which is hereby incorporated by reference in its entirety).

In one implementation, the ASR 110 may be configured to perform multi-pass speech recognition, where a primary speech recognition engine may generate a primary transcription of the utterance (e.g., using a large list dictation grammar), and may subsequently request one or more secondary transcriptions from one or more secondary speech recognition engines (e.g., using a virtual dictation grammar having decoy words for out-of-vocabulary words). In one implementation, the primary speech recognition engine may request the secondary transcriptions based on a confidence level for the primary transcription.

The recognition grammars employed in the ASR 110 may include various vocabularies, dictionaries, syllables, words, phrases, or other information for recognizing utterances. In one implementation, information contained in the recognition grammars may be dynamically optimized to improve a likelihood of accurate recognition for a given utterance (e.g., following an incorrect interpretation of a word or phrase, the incorrect interpretation may be removed from the grammar to reduce a likelihood of repeating the incorrect interpretation). Additionally, various forms of knowledge can be used to continually optimize the information contained in the recognition grammars on a dynamic basis. For example, the system 100 may have knowledge that includes environmental knowledge (e.g., peer-to-peer affinities, capabilities of the various devices in the environment, etc.), historical knowledge (e.g., frequent requests, prior context, etc.), or short term shared knowledge relating to a current conversational dialogue or interaction, among other types of knowledge.

In one implementation, the information in the recognition grammars may be further optimized according to context or application-specific domains. In particular, similar utterances may be interpreted differently depending on a context to which the utterance relates, including navigation, music, movies, weather, shopping, news, languages, temporal or geographic proximities, or other contexts or domains. For example, an utterance containing the word "traffic" may be subject to different interpretations depending on whether the context relates to navigation (i.e., road conditions), music (i.e., the 1960's rock band), or movies (i.e., the film directed by Steven Soderbergh). Accordingly, the ASR 110 may use various techniques to generate a preliminary interpretation of the natural language utterance, such as those described in the above-referenced co-pending U.S. Patent Applications and/or co-pending U.S. patent application Ser. No. 11/513,269, entitled "Dynamic Speech Sharpening," filed Aug. 31, 2006, the disclosure of which is hereby incorporated by reference in its entirety.

As such, the ASR 110 may provide one or more preliminary interpretations of the natural language utterance included in the voice-click to a conversational language processor 120. The conversational language processor 120 may include various natural language processing components collectively configured to model human-to-human conversations or interactions. For example, the conversational language processor 120 may include, among other things, an intent determination engine 130a, a constellation model 130b, one or more domain agents 130c, a context tracking engine 130d, a misrecognition engine 130e, and a voice search engine 130f. Furthermore, the conversational language processor 120 may be coupled to one or more data repositories 160 and one or more applications 150 associated with various contexts or domains.

Thus, the system 100 may use the various natural language processing components associated with the conversational language processor 120 in order to engage the user in a cooperative conversation and resolve voice-click device interactions based on the user's intent in initiating the voice-click. More particularly, the intent determination engine 130a may establish meaning for a given multi-modal device interaction based on capabilities of the system 100 as well as the capabilities of any other devices in the multi-device environment. For instance, referring to the example above where the user voice-clicked a particular intersection to determine "What restaurants are around here," the conversational language processor 120 may determine a conversational goal of the voice-click (e.g., "What" may indicate that the utterance relates to a query requesting data retrieval). In addition, the conversational language processor 120 may invoke the context tracking engine 130d to determine context for the voice-click. For example, to determine the voice-click context, the context tracking engine 130d may combine the context associated with the identified point of focus (i.e., the selected intersection) with context associated with the utterance (i.e., restaurants).

As a result, the combined context of the voice-click (which includes both the device interaction and the accompanying utterance) may provide sufficient information for routing a specific query. For example, the query may include various parameters or criteria relating to restaurants and the identified intersection. The conversational language processor 120 may then select a particular device, application, or other component to which the query may be routed for processing. For example, in one implementation, the conversational language processor 120 may evaluate the constellation model 130b, which contains a model of capabilities for each device in the multi-device environment. In one implementation, the constellation model 130b may contain, among other things, knowledge of processing and storage resources available to each of the devices in the environment, as well as the nature and scope of domain agents, context, capabilities, content, services, or other information for each of the devices.

As such, using the constellation model 130b and/or other information, the conversational language processor 120 may determine which device or combination of devices has suitable capabilities that can be invoked to process a given voice-click device interaction. For instance, again referring to the example given above, the conversational language processor 120 may determine that the context of the voice-click relates to an interaction with a navigation device and therefore route the query for processing using a navigation application 150. Results of the query may then be processed (e.g., to weigh the results based on knowledge of the user, such as a preference for vegetarian restaurants) and returned to the user via an output device 180.

Figure 2:
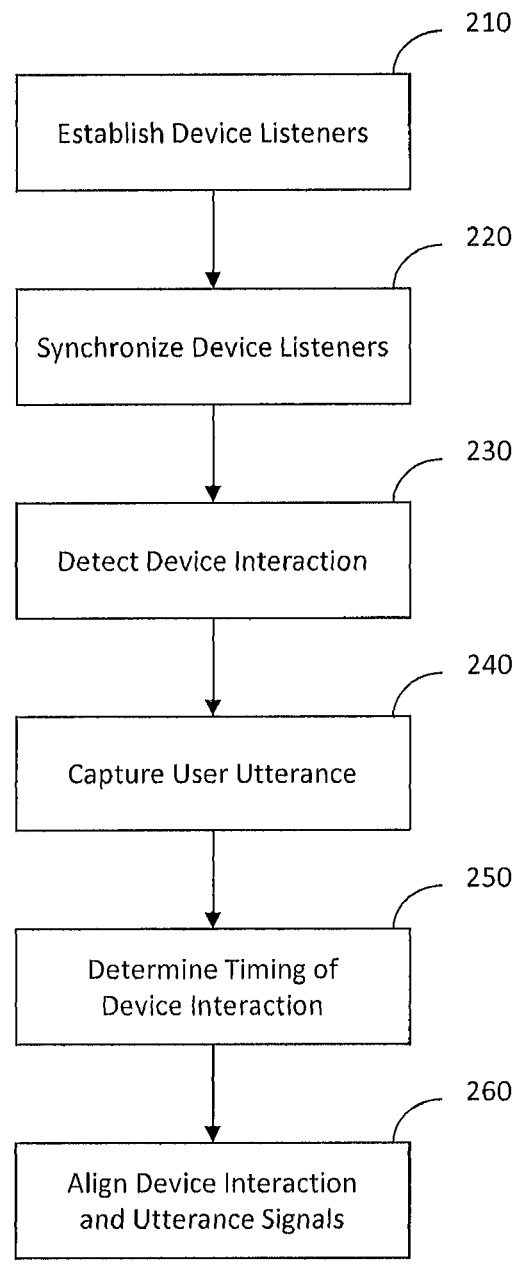
FIG. 2 illustrates a block diagram of an exemplary method for synchronizing multi-modal devices in a natural language voice service environment, according to various aspects of the invention.

According to various aspects of the invention, FIG. 2 illustrates a block diagram of an exemplary method for synchronizing multi-modal devices in a natural language voice service environment. As described above, multi-modal device interactions (or "voice-clicks") may generally occur when a user engages in one or more interactions with one or more multi-modal devices while also providing one or more natural language utterances that relate to the interactions with the multi-modal devices. In one implementation, context information relating to the interactions with the multi-modal devices may be combined with context information relating to the natural language utterances to determine an intent of the voice-click (e.g., to initiate a particular action, query, command, task, or other request).

In one implementation, various natural language processing components may be configured to continually listen or otherwise monitor the multi-modal devices to determine when voice-clicks occur. As such, the method illustrated in FIG. 2 may be used to calibrate or otherwise configure the components responsible for continually listening or otherwise monitoring the multi-modal devices. For example, in one implementation, the natural language voice service environment may include a plurality of multi-modal devices that provide different capabilities or services, and the user may engage in one or more voice-clicks to request services relating to any of the various devices or capabilities in any given device interaction.

To enable continuous listening for multi-modal device interactions or voice-clicks, each of the plurality of devices in the environment may be configured to receive information relating to a voice-click. Thus, in one implementation, an operation 210 may include establishing device listeners for each of the plurality of devices in the environment. Additionally, operation 210 may be performed in response to one or more new devices being added to the environment. The device listeners established in operation 210 may include any suitable combination of instructions, firmware, or other routines configured to be executed on one or more processing devices or other hardware components. For each device in the environment, the associated device listener may communicate with the device to determine capabilities, features, supported domains, or other information associated with the device. In one implementation, the device listeners may be configured to communicate with the device using the Universal Plug and Play protocol designed for ancillary computer devices. It will be apparent, however, that any suitable mechanism for communicating with the multi-modal devices may be used.

When device listeners have been established for each of the devices in the environment (or when device listeners have been established for new devices added to the environment), the various device listeners may be synchronized in an operation 220. In particular, each of the various devices may have different internal clocks or other timing mechanisms, wherein operation 220 may include synchronizing the various device listeners according to the respective internal clocks or timing mechanisms of the devices. In one implementation, synchronizing the device listeners may include each of the respective device listeners publishing information relating to the internal clock or timing of the associated device.

Thus, when one or more multi-modal interactions or voice-clicks subsequently occur for one or more of the devices, the associated device listener may detect information associated with the voice-click in an operation 230. For example, in one implementation, the various device listeners established in operation 210 may be associated with the voice-click module described above and illustrated in FIG. 1. Operation 230 may therefore include one or more of the device listeners or the voice-click module detecting an occurrence of a user interacting with one or more of the devices (e.g., selecting data associated with the device, identifying a point of focus or attention focus associated with the device, or otherwise engaging in one or more interactions or sequences of interactions with the device). Furthermore, an operation 240 may then comprise capturing an utterance from the user that relates to the device interaction detected in operation 230.

For example, a user viewing a web page presented on a display device may see a product name on the web page and desire more information about purchasing the product. The user may select text from the web page that contains the product name (e.g., using a mouse or keyboard to highlight the text), and then initiate a voice-click to ask "Is this available on Amazon.com?" In this example, operation 230 may include a device listener associated with the display device detecting the selection of the text associated with the product name, while operation 240 may include capturing the utterance inquiring about the availability of the product on Amazon.com.

As described above, each device that receives an input from the user may have an internal clock or timing mechanism. In an operation 250, each device may therefore determine when the input was received from a local perspective, and notify the voice-click module that the input was received. In particular, a given voice-click may include at least a natural language utterance received via a voice input device in addition to one or more further interactions with one or more other devices. The utterance may be received prior to, contemporaneously with, or subsequent to the device interactions, whereby operation 250 includes determining the timing of the device interaction for correlation with the associated utterance. In particular, using the device listener signals synchronized as described in reference to operation 220, an operation 260 may include aligning the signals for the device interactions and the utterance. In matching the device interaction and utterance signals, a voice-click input may be generated that includes aligned voice and non-voice components. The voice-click input may then be subject to further natural language processing, as described in greater detail below.

Figure 3:
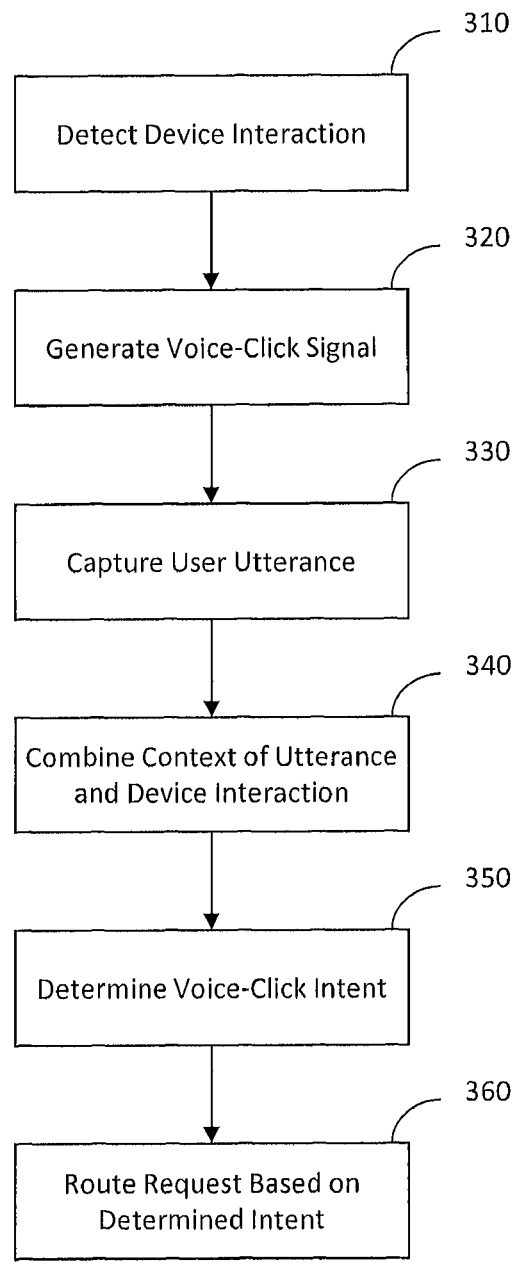
FIG. 3 illustrates a flow diagram of an exemplary method for processing multi-modal device interactions in a natural language voice service environment, according to various aspects of the invention.

According to various aspects of the invention, FIG. 3 illustrates a flow diagram of an exemplary method for processing multi-modal device interactions in a natural language voice service environment. As described above, multi-modal device interactions (or "voice-clicks") may generally occur when a user interacts with one or more multi-modal devices while also providing one or more natural language utterances related to the device interactions. As such, in one implementation, the method illustrated in FIG. 3 may be performed when one or more natural language processing components continually listen or otherwise monitor the one or more multi-modal devices to determine when one or more voice-clicks occur.

In one implementation, one or more device interactions may be defined as initiating a voice-click. For example, any given electronic device may generally support various distinguishable interactions, which may result in a given action, command, query, or other request being executed. Thus, in one implementation, any appropriate combination of device interactions that a given electronic device can uniquely recognize or otherwise use to generate a uniquely recognizable signal may be defined as a voice-click, wherein the voice-click may provide a signal indicating that a natural language utterance is to be processed together with context associated with the relevant device interactions. For example, devices that have a four-way or a five-way navigation button may support specific distinguishable interactions, wherein pressing the navigation button in a particular way may cause a specific task or other action to be performed, such as controlling a map display or calculating a route. In another example, a BlackBerry® device having a wheel selector may support interactions such as wheeling a cursor over a particular point of focus or attention focus, pressing the wheel to select specific data or a given application, or various other interactions. Various other device interactions may be used to indicate when a natural language utterance is to be processed together with context associated with the device interactions, without limitation, wherein the specific device interactions may vary in any given implementation. For example, the relevant device interactions may further include one or more of gesturing with a pointing or drawing instrument on a touch-sensitive screen (e.g., drawing an ear-shaped squiggle), a unique interaction method such as a long touch or double-tap, and/or if the system is operating in the continuous listening mode described above, a predefined contextual command word may indicate that a current device context is to be processed with a portion of the voice-based input that follows the contextual command word (e.g., the command word be "OK," "Please," "Computer," or another suitable word, wherein a user may select a specific point on a map and say "Please zoom in," or say "OK read it" when an e-mail is displayed, etc.).

As such, an operation 310 may include processing multi-modal device interactions in a natural language voice service environment to detect an occurrence of one or more device interaction that signal initiation of a voice-click. In particular, the device interactions detected in operation 310 may include any suitable interactions that cause an electronic device to generate a unique, recognizable, or otherwise distinguishable signal that relates to a user selecting data, identifying a point of focus or attention focus, invoking an application or task, or interacting with the device in another way, depending on the specific capabilities of the device.

In addition to the specific signal that the device generates in response to the user interaction, the interaction detected in operation 310 may signal initiation of a voice-click, whereby a prior, contemporaneous, or subsequent natural language voice input will provide further context for interpreting the device interaction detected in operation 310. For example, a natural language processing system may generally be configured to accept a voice input when particular device interactions occur (e.g., pressing a button to turn on a microphone). Thus, in the method illustrated in FIG. 3, the device interactions that signal an incoming voice input may further include any suitable interaction or combination of interactions with an electronic device, including interactions associated with a user selecting data, identifying a point of focus or attention focus, invoking an application or task, or interacting with the device in another way, depending on the specific capabilities of the device.

As such, when a voice-click device interaction has been detected in operation 310, a voice-click signal may be generated in an operation 320 to indicate that a natural language voice input should be associated with the interaction detected in operation 320. Subsequently, an operation 330 may include capturing a user utterance to be associated with the interaction detected in operation 310. In one implementation, the interaction detected in operation 310 may signal that a subsequent voice input will be provided, but it will be apparent that in one or more implementations the utterance captured in operation 330 may be provided prior to or contemporaneously with the interaction detected in operation 310 (e.g., a user may provide an utterance such as "Look up this artist on iTunes®" and subsequently voice-click the artist's name on a media player, or the user may provide the utterance while voice-clicking the artist's name, or the user may voice-click the artist's name and then provide the utterance).

When information relating to the voice-click device interactions and associated natural language utterance have been received, an operation 340 may include extracting and combining context information for the device interactions and the associated utterance. In particular, the context information extracted from the voice-click device interactions may include information relating to a segment, item, point of focus, attention focus, or data selected by the user, or to a particular device interaction or sequence of device interactions engaged in by the user. The extracted context for the device interaction may then be combined with context extracted for the natural language utterance captured in operation 330, wherein the combined context information may be used to determine an intent of the voice-click in an operation 350.

For example, in an exemplary voice-click device interaction, a user may be selectively copying a music collection from a media player to a backup storage device. While browsing the music on the media player, the user may encounter a particular song and voice-click the song while saying "Copy this whole album" (e.g., by pressing a particular button on the media player for an extended period of time while highlighting the song). In this example, operation 310 may include detecting the interaction of the extended button press, which causes the voice-click signal to be generated in operation 320. The utterance of "Copy this whole album" may then be captured in operation 330, and context information associated with the voice-click device interaction and the utterance may be combined in operation 340. In particular, the context of the device interaction may include information relating to the selected song, among other things (e.g., the context may further include information contained in metadata associated with the song, such as an ID3 tag for music files). Furthermore, the context of the utterance may include information identifying a copy operation and an album that contains the selected song.

As such, context information relating to voice-click interactions with the multi-modal devices may be combined with context information relating to the natural language utterances, whereby an operation 350 may determine the intent of the voice-click interaction. For instance, referring to the example above, the intent determined in operation 350 may include an intent to copy an album that contains the highlighted song from the media player to the backup storage device. Thus, in response to determining the intent of the voice-click in operation 350, one or more requests may be appropriately routed in an operation 360. In the example being discussed herein, operation 360 may include routing one or more requests to the media player to identify all of the data associated with the album that contains the highlighted song, and one or more requests to any appropriate combination of devices that can manage copying of the identified data from the media player to the backup storage device (e.g., a personal computer that interfaces with both the media player and the storage device).

Figure 4:
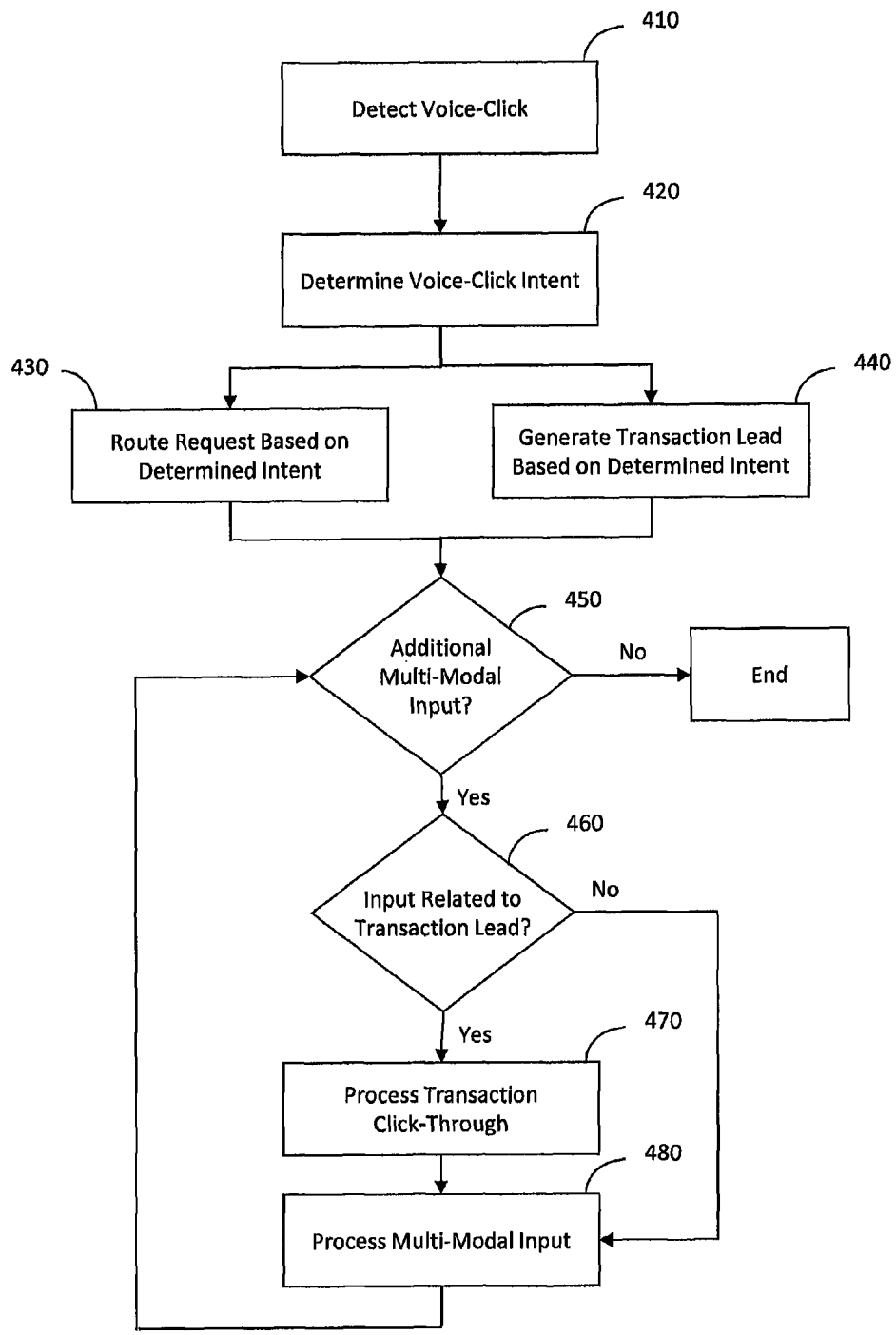
FIG. 4 illustrates a flow diagram of an exemplary method for processing multi-modal device interactions to generate one or more transaction leads in a natural language voice service environment, according to various aspects of the invention.

According to various aspects of the invention, FIG. 4 illustrates a flow diagram of an exemplary method for processing multi-modal device interactions to generate a transaction lead or "click-through" in a natural language voice service environment. In particular, the method illustrated in FIG. 4 may be used to generate a transaction lead or click-through in combination with one or more actions performed in response to one or more voice-click device interactions being detected.

For example, an operation 410 may include detecting one or more voice-click device interactions received from a user, wherein the voice-click device interactions may comprise any suitable combination of one or more device interactions coupled with one or more related natural language utterances. The user's intent in engaging in the voice-click device interactions may then be determined in an operation 420, and a subsequent operation 430 may include routing one or more requests to one or more processing devices based on the determined intent in order to resolve the voice-click interaction. In one implementation, operations 410, 420, and 430 may be performed in a manner similar to that described above in reference to FIG. 2 and FIG. 3, whereby signals for the device interactions may be aligned with signals for one or more natural language utterances and context information may be extracted from the signals to determine the intent of the voice-click device interaction.

In addition to routing one or more requests based on the user's intent, the method illustrated in FIG. 4 may further comprise generating one or more transaction leads that may result in one or more click-throughs. For example, a click-through may generally refer to an instance of a user clicking or otherwise selecting an electronic advertisement to access one or more services associated with the advertiser. In many electronic systems, click-throughs or click-through rates can provide mechanisms for measuring a user's interactions with an electronic advertisement, which may provide various measurements that advertisers can use to determine an amount to pay an entity that delivers the advertisement to users.

As such, the method illustrated in FIG. 4 may generate transaction leads, including advertisements or recommendations, whereby a user's voice-based input combined with a specific device interaction may provide further focus for generating transaction leads. In this manner, the advertisements or recommendations provided to the user may be more relevant to specific information with which the user may be interacting. Furthermore, using natural language cognitive models and shared knowledge relating to a user's preferences may provide further context for targeted transaction leads tailored to the specific user, which may thus be more likely to result in a click-through that can generate payment for a voice services provider.

Thus, in addition to routing one or more requests based on the user's intent in engaging in the voice-click device interaction, an operation 440 may include generating one or more transaction leads based on the determined intent. In particular, based on the combined context of the device interaction and the associated natural language utterance, the transaction leads may be processed in a manner "closer" to the user, in that local voice and non-voice context can be used as state data in any appropriate system that performs targeted advertising. For instance, referring to the example given above where a user selects an intersection displayed on a navigation device while saying "Find restaurants are around here," the transaction leads generated in operation 440 may include one or more advertisements or recommendations for restaurants near the intersection, which may be targeted to the user based on knowledge of the user's short-term and long-term preferences (e.g., a preferred type of restaurant, a preferred price range, etc.).

The transaction leads may then be presented to the user (e.g., as selectable points on a map display). The user's subsequent multi-modal device interactions may then be monitored in an operation 450 to determine whether or when one or more further multi-modal device interactions occur. If no further interactions occur, a determination may be made that the user did not act on the transaction lead and the process may then end. If an additional multi-modal interaction does occur, however, the multi-modal input may be processed in an operation 480 to determine an intent of the input and route one or more requests accordingly. In addition, an operation 460 may include determining whether the multi-modal input relates to the transaction lead generated in operation 440. For example, the user may select one of the advertised or recommended restaurants by providing an utterance, a non-voice device interaction, or a voice-click device interaction requesting further action or information relating to the transaction lead. In such a case, an operation 470 may further include processing a transaction click-through in relation to the transaction lead generated in operation 440, wherein the transaction click-through may be used to determine payment or otherwise generate revenue for a particular entity (e.g., a provider of the voice services or another entity associated with the transaction lead or transaction click-through).

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, or other storage media, and a machine-readable transmission media may include forms of propagated signals, such as carrier waves, infrared signals, digital signals, or other transmission media. Further, firmware, software, routines, or instructions may be described in the above disclosure in terms of specific exemplary aspects and implementations of the invention, and performing certain actions. However, it will be apparent that such descriptions are merely for convenience, and that such actions in fact result from computing devices, processors, controllers, or other devices executing the firmware, software, routines, or instructions.

Although the descriptions provided herein have generally focused on techniques for processing multi-modal device interactions in a natural language voice services environment, it will be apparent that various further natural language processing capabilities may be used in connection with, in addition to, or in lieu of those described in connection with the specific aspects and implementations discussed herein. For example, in addition to the techniques described in the co-pending U.S. Patent Applications referenced above, the systems and methods described herein may further utilize natural language processing capabilities as described in co-pending U.S. patent application Ser. No. 11/197,504, entitled "Systems and Methods for Responding to Natural Language Speech Utterance," filed Aug. 5, 2005, U.S. patent application Ser. No. 11/200,164, entitled "System and Method of Supporting Adaptive Misrecognition in Conversational Speech," filed Aug. 10, 2005, U.S. patent application Ser. No. 11/212,693, entitled "Mobile Systems and Methods of Supporting Natural Language Human-Machine Interactions," filed Aug. 29, 2005, U.S. patent application Ser. No. 11/580,926, entitled "System and Method for a Cooperative Conversational Voice User Interface," filed Oct. 16, 2006, U.S. patent application Ser. No. 11/671,526, entitled "System and Method for Selecting and Presenting Advertisements Based on Natural Language Processing of Voice-Based Input," filed Feb. 6, 2007, and U.S. patent application Ser. No. 11/954,064, entitled "System and Method for Providing a Natural Language Voice User Interface in an Integrated Voice Navigation Services Environment," filed Dec. 11, 2007, the disclosures of which are hereby incorporated by reference in their entirety.

Accordingly, aspects and implementations of the invention may be described herein as including a particular feature, structure, or characteristic, but it will be apparent that every aspect or implementation may or may not necessarily include the particular feature, structure, or characteristic. In addition, when a particular feature, structure, or characteristic has been described in connection with a given aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, with the scope of the invention determined solely by the appended claims.

What is claimed is:

1. A method for processing one or more multi-modal device interactions, received from a user, in a natural language voice services environment that includes a plurality of components that handle requests relating to the multi-modal device interact, the method being implemented on a computer system having one or more physical processors programmed with computer program instructions that, when executed by the one or more physical processors, program the computer system to perform the method, the method comprising:
   detecting, by the computer system, at least one multi-modal device interaction, wherein the multi-modal device interaction includes a non-voice interaction, from the user, with at least one of the plurality of components or an application associated with at least one of the plurality of components, and wherein the multi-modal device interaction further includes at least one natural language utterance, from the user, relating to the non-voice interaction;
   determining, by the computer system, a context relating to the non-voice interaction and a context relating to the natural language utterance;
   determining, by the computer system, an intent of the multi-modal device interaction based on the context relating to the non-voice interaction and the context of the natural language utterance;
   generating, by the computer system, a request based on the determined intent;
   obtaining, by the computer system, information indicating a capability of a component, from among the plurality of components, based on a constellation model that specifies the capabilities of each of the plurality of components;
   determining, by the computer system, that the component should handle the request based on the capability of the component; and
   routing, by the computer system, the request to the component.

2. The method of claim 1, wherein detecting the multi-modal interaction comprises:
   receiving, by the computer system, the non-voice interaction from a first input device; and
   receiving, by the computer system, the natural language utterance from a second input device separate from the first input device.

3. The method of claim 1, wherein detecting the multi-modal interaction comprises:
   receiving, by the computer system, both the non-voice interaction and the natural language utterance from a first input device.

4. The method of claim 1, wherein detecting the multi-modal interaction comprises:
   receiving, by the computer system, the natural language utterance from a first input device;
   receiving, by the computer system, the natural language utterance from a second input device separate from the first input device, wherein either or both of the natural language utterance from the first input device and the natural language utterance from the second input device is used to determine the context of the natural language utterance.

5. The method of claim 1, wherein the request comprises a query, a command, or both a query and a command.

6. The method of claim 1, wherein the component comprises an electronic device identified from among a plurality of electronic devices that are separate from each other.

7. The method of claim 1, wherein the component comprises an application identified from among a plurality of applications.

8. The method of claim 7, wherein the plurality of applications are executed within a single electronic device.

9. The method of claim 7, wherein at least a first one of the plurality of applications is executed within a first electronic device and at least a second one of the plurality of applications is executed within a second electronic device.

10. The method of claim 1, wherein detecting at least one multi-modal device interaction comprises:
    receiving, by the computer system, a first text selection associated with a browser application, wherein the non-voice interaction comprises the first text selection, and wherein determining an intent of the multi-modal device interaction comprises using one or more words from the text selection together with the context relating to the natural language utterance.

11. The method of claim 1, wherein detecting at least one multi-modal device interaction comprises:
    receiving, by the computer system, a first location selection associated with a mapping application, wherein the non-voice interaction comprises the first location selection, and wherein determining an intent of the multi-modal device interaction comprises using a location identified from the first location selection together with the context relating to the natural language utterance.

12. The method of claim 1, wherein detecting at least one multi-modal device interaction comprises:
    receiving, by the computer system, an input associated with information identifying a first type of input device used to provide the input, wherein the non-voice interaction comprises the input, and wherein determining an intent of the multi-modal device interaction comprises using the information identifying the first type of input device together with the context relating to the natural language utterance.

13. The method of claim 1, further comprising:
    generating, by the computer system, at least one transaction lead based on the request.

14. The method of claim 13, wherein the at least one transaction lead comprises an advertisement or a recommendation identified based on user preferences.

15. A system for processing one or more multi-modal device interactions, received from a user, in a natural language voice services environment that includes a plurality of components that handle requests relating to the multi-modal device interact, comprising:
    a computer system having one or more physical processors programmed with computer instructions that, when executed by the one or more physical processors, program the computer system to:
    detect at least one multi-modal device interaction, wherein the multi-modal device interaction includes a non-voice interaction, from the user, with at least one of the plurality of components or an application associated with at least one of the plurality of components, and wherein the multi-modal device interaction further includes at least one natural language utterance, from the user, relating to the non-voice interaction;

determine a context relating to the non-voice interaction and a context relating to the natural language utterance;

determine an intent of the multi-modal device interaction based on the context relating to the non-voice interaction and the context of the natural language utterance;

generate a request based on the determined intent;

obtain information indicating a capability of a component, from among the plurality of components, based on a constellation model that specifies the capabilities of each of the plurality of components;

determine that the component should handle the request based on a capability of the component; and route the request to the component.

16. The system of claim 15, wherein to detect the at least one multi-modal interaction, the computer system is further programmed to:

receive the non-voice interaction from a first input device; and receive the natural language utterance from a second input device separate from the first input device.

17. The system of claim 15, wherein to detect the at least one multi-modal interaction, the computer system is further programmed to:

receive both the non-voice interaction and the natural language utterance from a first input device.

18. The system of claim 15, wherein to detect the at least one multi-modal interaction, the computer system is further programmed to:

receive the natural language utterance from a first input device;

receive the natural language utterance from a second input device separate from the first input device, wherein either or both of the natural language utterance from the first input device and the natural language utterance from the second input device is used to determine the context of the natural language utterance.

19. The system of claim 15, wherein the request comprises a query, a command, or both a query and a command.

20. The system of claim 15, wherein the component comprises an electronic device identified from among a plurality of electronic devices that are separate from each other.

21. The system of claim 15, wherein the component comprises an application identified from among a plurality of applications.

22. The system of claim 21, wherein the plurality of applications are executed within a single electronic device.

23. The system of claim 21, wherein at least a first one of the plurality of applications is executed within a first electronic device and at least a second one of the plurality of applications is executed within a second electronic device.

24. The system of claim 15, wherein to detect the at least one multi-modal interaction, the computer system is further programmed to:

receive a first text selection associated with a browser application, wherein the non-voice interaction comprises the first text selection, and wherein to determine an intent of the multi-modal device interaction, the computer system is further programmed to use one or more words from the text selection together with the context relating to the natural language utterance.

25. The system of claim 15, wherein to detect the at least one multi-modal interaction, the computer system is further programmed to:

receive a first location selection associated with a mapping application, wherein the non-voice interaction comprises the first location selection, and wherein to determine an intent of the multi-modal device interaction, the computer system is further programmed to use a location identified from the first location selection together with the context relating to the natural language utterance.

26. The system of claim 15, wherein to detect the at least one multi-modal interaction, the computer system is further programmed to:

receive an input associated with information identifying a first type of input device used to provide the input, wherein the non-voice interaction comprises the input, and wherein to determine an intent of the multi-modal device interaction, the computer system is further programmed to use the information identifying the first type of input device together with the context relating to the natural language utterance.

27. The system of claim 15, wherein computer system is further programmed to:

generate at least one transaction lead for presentation based on the request.

28. The system of claim 27, wherein the at least one transaction lead comprises an advertisement or recommendation identified based on user preferences associated with the multi-modal device interaction.

29. The system of claim 15, wherein the computer system is further programmed to:

receive a set of potential responses to the request from the identified component, the set of responses including a first response and a second response;

obtain information known about the user; and weight the first response and the second response based on the information.

30. The system of claim 15, wherein the computer system is further programmed to:

receive an indication of a new component being added to the system; and initiate a device listener that detects a non-voice interaction, a voice interaction, or both a non-voice interaction and a voice interaction, for the new component.

31. The system of claim 30, wherein the computer system is further programmed to:

identify at least one capability of the new component; and add, to the constellation model, information specifying the at least one capability and information identifying the new component.

32. The system of claim 15, wherein to determine the context relating to the natural language utterance, the computer system is further programmed to:

provide the natural language utterance as an input to an automated speech recognizer (ASR); and receive as an output from the ASR one or more words of the natural language, wherein the context relating to the natural language utterance is determined based on the one or more words.

33. The system of claim 15, wherein to generate the request, the computer system is further programmed to:

determine a first portion of the request based on the context relating to the non-voice interaction; and determine a second portion of the request based on the context of the natural language utterance.

* * * * *